(12) United States Patent
Moore et al.

(10) Patent No.: US 11,066,057 B2
(45) Date of Patent: Jul. 20, 2021

(54) METHOD FOR OPERATING A MOTOR VEHICLE HYDRAULIC BRAKE SYSTEM

(71) Applicant: Ford Global Technologies, LLC, Dearborn, MI (US)

(72) Inventors: Ian Moore, Pulheim (DE); Christian Schmaler, Aachen (DE); Matthias Baumann, Cologne (DE); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 15/717,875

(22) Filed: Sep. 27, 2017

(65) Prior Publication Data

US 2018/0086323 A1 Mar. 29, 2018

(30) Foreign Application Priority Data

Sep. 28, 2016 (DE) .................. 102016218681.7

(51) Int. Cl.
*B60T 8/44* (2006.01)
*B60T 7/04* (2006.01)
*B60T 8/171* (2006.01)
*B60T 8/172* (2006.01)
*B60T 13/16* (2006.01)
*B60T 13/46* (2006.01)

(52) U.S. Cl.
CPC .............. *B60T 8/441* (2013.01); *B60T 7/042* (2013.01); *B60T 8/171* (2013.01); *B60T 8/172* (2013.01); *B60T 8/442* (2013.01); *B60T 13/166* (2013.01); *B60T 13/46* (2013.01)

(58) Field of Classification Search
CPC .......... B60T 8/171; B60T 8/172; B60T 8/441; B60T 7/042; B60T 13/166
See application file for complete search history.

(56) References Cited

U.S. PATENT DOCUMENTS

| 6,033,038 | A  | * | 3/2000  | Kulkarni  | B60T 8/442  |
|           |    |   |         |           | 303/113.3   |
| 8,157,332 | B2 |   | 4/2012  | Kato et al. |           |
| 8,457,851 | B2 |   | 6/2013  | Epple et al. |          |
| 8,944,528 | B2 |   | 2/2015  | Pursifull et al. |      |
| 8,989,992 | B2 |   | 3/2015  | Lippok    |             |
| 2002/0117347 | A1 | * | 8/2002 | Nishizaki | B60T 8/1755 |
|           |    |   |         |           | 180/403     |
| 2010/0280723 | A1 | * | 11/2010 | Epple    | B60T 7/12   |
|           |    |   |         |           | 701/70      |
| 2011/0006591 | A1 | * | 1/2011 | Yoshii    | B60T 7/12   |
|           |    |   |         |           | 303/4       |
| 2014/0110994 | A1 | * | 4/2014 | Gruber    | B60T 13/146 |
|           |    |   |         |           | 303/3       |

FOREIGN PATENT DOCUMENTS

WO    WO2012101010 A2    8/2012

\* cited by examiner

*Primary Examiner* — Melody M Burch
(74) *Attorney, Agent, or Firm* — Raymond L. Coppiellie; Burgess Law Office, PLLC

(57) ABSTRACT

A method for operating a hydraulic brake system of a motor vehicle having a brake booster and a hydraulic brake boost wherein a brake pressure is detected and an underpressure, prevailing in an underpressure chamber of the brake booster is estimated on the basis of the detected brake pressure. The hydraulic brake boost controlled based on the estimated underpressure, with the estimated underpressure taking into account an actuation of the hydraulic brake boost.

15 Claims, 1 Drawing Sheet

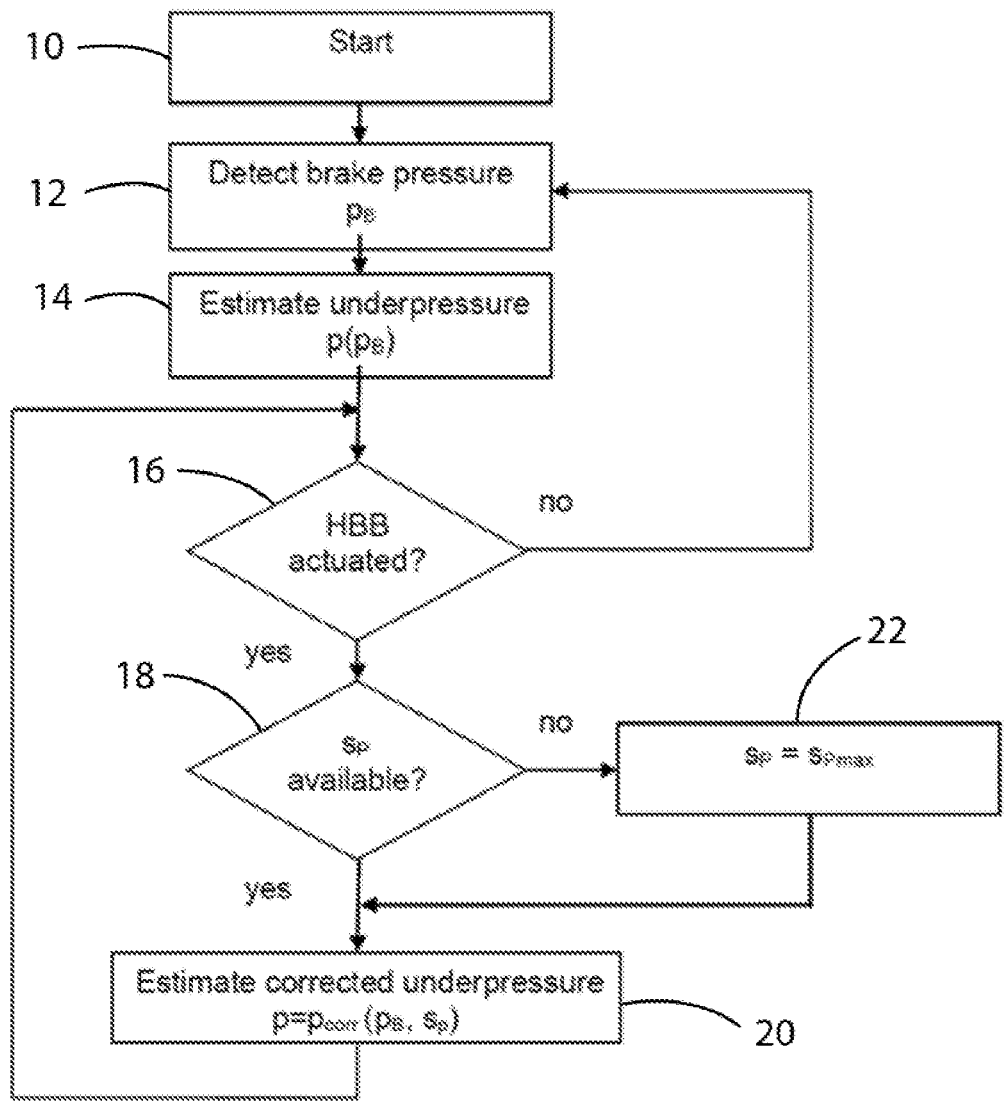

METHOD FOR OPERATING A MOTOR VEHICLE HYDRAULIC BRAKE SYSTEM

CROSS-REFERENCE TO RELATED APPLICATIONS

Not Applicable

BACKGROUND OF THE INVENTION

1. Field of the Invention

The invention relates to a method for operating a motor vehicle hydraulic brake system and, more particularly, for controlling a hydraulic brake booster.

2. Description of Related Art

Modern motor vehicles typically use a hydraulic brake system wherein a brake pedal activates a piston, connected to the brake pedal, of a master brake cylinder. The piston moves in a pressure chamber filled with brake fluid and generates a pressure, passed on via hydraulic lines, to at least one wheel brake device. The wheel brake device includes a wheel brake cylinder which, based on the pressure of the brake fluid, moves brake calipers with brake linings fitted thereon into abutment against a brake drum or a brake disk. The braking force acting on the wheel connected to the brake drum or brake disk generated and metered by activating the brake pedal. The master brake cylinder may be a tandem master brake cylinder having two pressure chambers arranged one behind the other and separated by a secondary piston to apply pressure to two independent brake circuits.

To boost braking force, the brake system may include a brake booster generating, based on brake pedal activation, an additional force acting in the activation direction of the brake pedal. The additional force moves the piston of the master brake cylinder with increased force in the activation direction. The brake booster includes a working diaphragm, arranged between an underpressure chamber and a working chamber, connected to the piston rod of the master brake cylinder. If the brake pedal is not activated, the same pressure, in particular an underpressure made available, for example, in the intake manifold of the engine of the motor vehicle or by a suction pump, prevails in the underpressure chamber and in the working chamber. When the driver activates the brake pedal, the working chamber is subjected to, via a valve, a relatively high pressure provided by connection to the atmosphere. As a result, an additional force, dependent on the pedal force exerted on the brake pedal or the pedal travel, assists the pedal force produced on the piston rod.

The maximum additional force that can be generated depends on the underpressure prevailing in the brake booster. When the motor vehicle is operating, situations can occur wherein the generated maximum additional force is not sufficient to generate the desired braking force. For example, an emergency braking situation may require a high braking pressure and the underpressure present in the brake booster may not be sufficient to generate the desired braking pressure. In this case, a hydraulic brake boosting operation (Hydraulic Brake Boost or HBB), also referred to below as hydraulic brake boosting operation, can provide additional brake fluid in the direction of the wheel brake devices with one or more brake fluid pumps resulting in an increased pressure in the wheel brake cylinders. Such brake fluid pumps are usually present in motor vehicles, often as a part of a vehicle movement dynamics control system. The hydraulic brake boost results in generation of a higher braking force than would be possible in the respective situation solely by the master brake cylinder and associated brake booster.

Knowledge of the underpressure prevailing in the brake booster or in an underpressure reservoir connected thereto is required to control the hydraulic brake boosting operation. An underpressure sensor may also provide a signal used to control the HBB. However, such a sensor causes increased expenditures in fabrication and maintenance.

Inaccuracies occur with known methods for estimating the underpressure prevailing in the brake booster, when the hydraulic brake boosting operation is actuated, because the measured brake pressure in the master brake cylinder does not permit clear conclusions to be drawn about the travel of the diaphragm in the brake booster when the hydraulic brake boosting operation is actuated. In addition, actuating the hydraulic brake boosting operation may cause a drop in pressure in the master brake cylinder even though the wheel brake pressure acting in the wheel brake devices increases and the brake pedal is not released, but instead continues to be depressed by the driver. In known methods, the decrease in the pressure in the master brake cylinder can be evaluated similarly to a release of the brake pedal, which gives rise to an incorrect estimation of the consumption of the underpressure and therefore to an incorrect estimation of the prevailing underpressure. An incorrect estimation of the underpressure or of the underpressure reserve can have a disadvantageous effect on the functionality of the hydraulic brake boosting operation.

SUMMARY OF THE INVENTION

A method for operating a hydraulic brake system of a motor vehicle having a brake booster and a hydraulic brake boost comprising the steps of detecting a brake pressure and estimating an underpressure prevailing in an underpressure chamber of the brake booster based on the detected brake pressure and an actuation of the hydraulic brake boost. The method includes controlling the hydraulic brake boost based on the estimated underpressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a flowchart of a method according to an exemplary embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

When the motor vehicle is operating and the driver activates the brake pedal and continuously increases the exerted brake pedal force, it results in an increase in the absolute air pressure in the working chamber caused by the changing position of the valve in the brake booster. This slightly reduces the underpressure prevailing in the underpressure chamber, i.e. the absolute pressure in the underpressure chamber increases slightly since the volume of the chamber shrinks because of the movement of the diaphragm while the number of air molecules initially remains the same.

If the increasing brake pressure exceeds a corresponding threshold value, the HBB actuates whereby a brake fluid pump of the vehicle movement dynamics control system pumps brake fluid from the master brake cylinder to the wheel brake cylinders causing a pressure drop in the master brake cylinder. If the piston rod or diaphragm position of the brake booster were determined solely on the basis of the brake pressure in the master brake cylinder, a reduction of the underpressure reserve in the brake booster would be inferred even though the brake pedal did not move and therefore no underpressure was actually consumed.

Depending on the instantaneous delivery capacity of the fluid pump, too little brake fluid may flow on from the brake fluid reservoir into the master brake cylinder. This leads to a situation in which although the measured brake pressure drops the brake pedal is depressed further with a constant applied pedal force. If the brake pedal is then released by the driver and as a result the HBB and the fluid pump are deactivated, the piston of the master brake cylinder is moved back and the position of the valve in the brake booster connects the working chamber to the underpressure chamber. This results in a drop in the underpressure reserve, a rise in the absolute pressure in the underpressure chamber. Owing to the actuation of the brake fluid pump by the HBB, the brake pedal has therefore been deflected further, which can bring about an increased consumption of underpressure when the brake pedal is released.

Estimation faults of the consumption of the underpressure can be avoided. It possible, for example, to make use of information about the brake pedal travel, for example an estimation of the pedal travel, on the basis of the properties of the current actuation or of a preceding actuation of the HBB. A fixed value could also be assumed for the pedal travel, with the fixed value added at each HBB actuation operation to the pedal travel derived from the brake pressure, or the maximum possible pedal travel could be assumed. An improved estimation of the underpressure prevailing in the brake booster and therefore improved actuation or control of the hydraulic brake boosting operation can be achieved.

FIG. 1 is a flowchart of a method according to an exemplary embodiment of the present invention. Initially the method starts at step 10 wherein the vehicle is in a driving mode in which the motor vehicle moves with a velocity of $v > v_S$, where $v_S$ is a threshold value. When v is less than $v_S$ it indicates a motor vehicle stationary state. At step 12 the brake pressure $p_B$, the hydraulic pressure prevailing in the master brake cylinder, is detected for example, using a pressure sensor positioned in a pressure chamber of the master brake cylinder or in a region of the fluid system of the brake system connected to the master brake cylinder.

At step 14, an underpressure p, prevailing in an underpressure reservoir of the brake booster, is continuously estimated. The underpressure reservoir supplied with underpressure by connecting the reservoir to the intake manifold of the engine of the motor vehicle or to an underpressure pump making available the underpressure of the underpressure chamber and of the working chamber of the brake booster. The estimation of the underpressure p determined based on the brake pressure $p_B$, detected by the pressure sensor associated with the master brake cylinder. In this context, in estimation of the underpressure p can take place. The estimation, for example, taking into account the engine speed, as described, for example, in U.S. Pat. No. 8,989,992, incorporated into the present application by reference.

In step 16, the underpressure p is continuously checked, for example based on an actuation signal indicating actuation of the hydraulic brake booster, and whether the brake booster is actuated. If not, the method returns to step 12 and detects brake pressure $p_B$ and then to step 14 to estimate the underpressure p in the fashion specified above.

Upon detecting actuation of the HBB in step 16 the method checks, in step 18, whether a value for the brake pedal travel sp is available. The brake pedal travel value can be, for example, a measured value detected with a pedal travel sensor, or a value estimated, for example, based on the brake pressure $p_B$. If a measured or estimated value sp is available based on brake pedal travel, a consumption of the underpressure in the underpressure reservoir is determined based on this value sp, and in step 20 a corrected value $p_{corr}$ for the underpressure in the brake booster is estimated based on the determined consumption and the brake pressure $p_B$. If no measured or estimated value sp is available for the brake pedal travel, then in step 22 the maximum possible brake pedal travel $s_{Pmax}$ is used instead of the measured or estimated value sp, and a consumption of the underpressure in the underpressure reservoir is determined based on $s_{Pmax}$, and the corrected value $p_{corr}$ for the underpressure in the brake booster is estimated based on the determined consumption and the brake pressure $p_B$. During the estimation of $p_{corr}$, further input variables, for example the ambient pressure and a signal indicating engine operation or underpressure pump operation, can be considered in both cases.

The underpressure $p_{corr}$, estimated in this way, is less sensitive to the abovementioned fault sources, is available for the control of the HBB, provides a basis for further estimation of the underpressure p after the hydraulic brake boosting operation has ended, provides for further control of the HBB, and, if appropriate, for controlling further functions of the brake system or of the motor vehicle.

In an exemplary embodiment, the method operates with a brake system of a motor vehicle, the brake system being a hydraulic brake system having at least one wheel brake device acting on at least one wheel of the motor vehicle. The brake system including, for example, a wheel brake cylinder, to which a brake fluid under pressure can be applied. The brake system having a brake booster operated with underpressure that boosts an activation force exerted with a brake pedal. The brake booster acts on a piston rod of a master brake cylinder communicating fluidically with the at least one wheel brake device. Activating the brake pedal, moves the piston of the master brake cylinder in an activation direction, resulting in an increase in pressure, assisted by the brake booster, in a pressure chamber of the master brake cylinder. The generated pressure conveyed via the brake fluid to the wheel brake devices, where a braking force acts on the respective wheel corresponding to the generated pressure.

The brake system also includes a hydraulic brake boost (HBB). Actuation of the HBB uses one or more brake fluid pumps to feed additional brake fluid to the wheel brake devices resulting in an increased wheel brake pressure at the wheel brake cylinders. A brake system equipped with a vehicle movement dynamics control system including, for example, an anti-lock brake system or an electronic stability control system typically include brake fluid pumps for generating an additional increase in pressure in the wheel brake devices.

According to one embodiment of the invention, the method starts at step 10 and then moves to step 12 wherein a hydraulic pressure, referred to as the brake pressure $p_B$, is detected in the brake system. The method then estimates, at step 14, an underpressure $p(p_B)$ prevailing in an underpressure chamber of the brake booster based on the detected brake pressure $p_B$. The method includes controlling the hydraulic brake boost (HBB) based on the estimated underpressure $p(p_B)$, it being possible to provide and take account of further input variables during the control of the hydraulic brake boosting operation. In particular, actuation of the HBB based on a comparison of the estimated underpressure $p(p_B)$ with the detected brake pressure $p_B$ or with an underpressure necessary to reach a desired brake pressure.

In one embodiment, the underpressure prevailing in the underpressure chamber of the brake booster is estimated taking into account an actuation of the HBB. Actuation of the HBB determined, for example, by detecting an actuation signal or an actuation parameter of the HBB. Additional input variables may be taken into account for the estimation of the underpressure, along with the brake pressure and the actuation signal or actuation parameter. The underpressure $p(p_B)$ estimated in this way can be provided, for example, as a starting point for a continuous further estimation of the underpressure $p(p_B)$ after the hydraulic brake boost operation has ended, and for any subsequent actuation of the HBB.

Estimating the underpressure $p(p_B)$ prevailing in the underpressure chamber of the brake booster taking into account an actuation of the HBB permits improved estimation of the underpressure and correction of inaccuracies that may arise from the effect of the brake fluid pumps and/or from activation of the brake pedal with the hydraulic brake boosting operation. It has been realized that the reaction of the HBB to the detection of the influencing variables relevant for the control of the HBB and the brake pedal activation operations taking place during or after the ending of the hydraulic brake boosting operation can be a significant cause of non-optimal triggering or execution of the HBB. The method according the exemplary embodiment permits the faults caused in this way, in particular incorrect estimation of the underpressure prevailing in the brake booster, to be corrected, and therefore permits improved control of the hydraulic brake boosting operation.

The detected brake pressure $p_B$ is, in particular, the hydraulic pressure prevailing in the master brake cylinder. The pressure can be detected, for example, with a pressure sensor arranged in a pressure chamber of the master brake cylinder or in a region of the fluid system of the brake system which is fluidically connected thereto. Simple and reliable detection of the brake pressure $p_B$ is made possible.

The underpressure $p(p_B)$ is preferably estimated based on the brake pedal travel. Brake pedal travel is how far the brake pedal is pressed in compared to a position of rest, and therefore constitutes a measure for the activation of the brake pedal. Brake pedal travel results in application of atmospheric pressure to the working chamber of the brake booster, and therefore both the boosting force generated by the brake booster and the consumption of the underpressure generated by an underpressure source and made available in the underpressure chamber of the brake booster or an underpressure reservoir. In the exemplary embodiment, a pressure change in the underpressure chamber or in the underpressure reservoir can be determined from the brake pedal travel. In this context, the known volumes of the working chamber and of the underpressure chamber, or of the underpressure reservoir, and the known dependence of the function of the valve, coupled to the brake pedal, of the brake booster on the brake pedal travel are taken into account. A current value of the prevailing underpressure $p(p_B)$ is estimated from the change in the pressure and from the consumption of the underpressure. In this way, the estimation of a value of the underpressure $p(p_B)$ prevailing in the brake booster is possible without a separate pressure sensor being required for this.

Multiple activation operations of the brake pedal, taking place, for example, in a predefined time period, are detected, if appropriate, in addition to the brake pedal travel, and are taken into account in the estimation of the underpressure $p(p_B)$. The detection of the number of activation operations permits the consumption or the change in the underpressure to be detected over a predefinable period of time. As a result, more accurate estimation of the underpressure $p(p_B)$ prevailing in the brake booster is likewise made possible without a separate pressure sensor being required for this.

In one embodiment, there may be provision wherein activation of the brake pedal is detected by detecting the brake pressure or the time profile thereof, that is the hydraulic pressure prevailing in the master brake cylinder. Since the brake pedal is connected to the master brake cylinder, the generated brake pressure depends on the brake pedal travel and permits it to be detected. Likewise, the number of activation operations of the brake pedal can be detected. In this way, an estimation of the underpressure $p(p_B)$ prevailing in the brake booster is made possible solely based on the brake pressure $p_B$, detected by a pressure sensor assigned to the master brake cylinder.

The underpressure $p(p_B)$ is preferably estimated taking into account an ambient pressure, in particular the atmospheric pressure, and a signal from an underpressure source that supplies the underpressure chamber or the underpressure reservoir with underpressure. The underpressure source can be, for example, an intake manifold of the engine of the motor vehicle or an underpressure pump. The signal from the underpressure source can specify, for example, whether the engine or the underpressure pump is operating or not. A further improved estimation of the underpressure prevailing in the brake booster is made possible.

When the underpressure $p(p_B)$ is estimated it can advantageously be assumed that the underpressure is constant during actuation of the hydraulic brake boosting function. This is at least approximately the case since the HBB is generally deactivated by releasing the brake pedal, and therefore if the HBB is actuated, the brake pedal is not released and no corresponding consumption of the underpressure takes place. As a result, an improved estimation of the underpressure is easily made possible.

If the brake pedal is released during or at the ending of the hydraulic brake boosting operation, an increased value for the brake pedal travel is preferably assumed for the estimation of the underpressure $p(p_B)$ based on the brake pedal travel. The maximum possible brake pedal travel can be assumed for the increased value of the brake pedal travel. It is easily made possible to take into account, during the estimation of the underpressure $p(p_B)$ after the HBB ends, that in such a situation the consumption of the underpressure is greater than corresponds to the brake pedal travel when the HBB is actuated. Therefore, during the actuation of the HBB the brake pedal travel can increase, whereby if the brake pedal is released again at the ending, or after the ending, of the hydraulic brake boosting operation the consumption of the underpressure occurring as a result of the backward movement of the brake pedal would be underestimated. In this way, a further improved estimation of the underpressure $p(p_B)$ can be made possible, the estimated value being made available in a known fashion after the deactivation of the HBB for a continuation of the estimation of the underpressure $p(p_B)$ and for renewed actuation of the HBB or for other functions of the brake system or of the motor vehicle.

In one embodiment, there may be provision wherein the hydraulic brake boosting function is actuated when a threshold value for the underpressure prevailing in the underpressure chamber of the brake booster or in the underpressure reservoir is undershot. This threshold value can, for example, be permanently predefinable or can depend on the respective situation, for example on the brake pedal travel. Intervention of the HBB for generating a braking force sufficient in the respective situation is easily made possible.

The hydraulic brake boosting function is preferably not actuated, independently of the estimated underpressure $p(p_B)$ value, if a velocity of the motor vehicle is below a velocity threshold value or the detected brake pressure is below a pressure threshold value. In these cases, it can be assumed that the actuation of the HBB is unnecessary and unnecessary operation of the brake fluid pump is avoided.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating a hydraulic brake system of a motor vehicle having a brake booster and a hydraulic brake boost comprising:
   detecting a brake pressure;
   estimating an underpressure prevailing in an underpressure chamber of the brake booster based on the detected brake pressure and an actuation of the hydraulic brake boost; and
   controlling the hydraulic brake boost based on the estimated underpressure.

2. The method of claim 1 wherein the brake pressure is the hydraulic pressure prevailing in a master brake cylinder.

3. The method of claim 1 wherein the estimated underpressure is based on travel of a brake pedal.

4. The method of claim 3 wherein the estimated underpressure is based on a number of times the brake pedal travels.

5. The method of claim 3 wherein the brake pedal travel is determined on the basis of the detected brake pressure.

6. The method of claim 1 wherein the estimated underpressure accounts for an ambient pressure.

7. The method of claim 1 including presuming the estimated underpressure remains constant during actuation of the hydraulic brake boost.

8. The method of claim 3 wherein when the brake pedal is released after the hydraulic brake boost has ended, the estimated underpressure includes an increased value for the brake pedal travel.

9. The method of claim 8 wherein the increased value for the brake pedal travel is limited to a maximum amount of brake pedal travel.

10. The method of claim 1 wherein the hydraulic brake boost is actuated when a threshold value for the estimated underpressure is undershot.

11. The method of claim 1 wherein the hydraulic brake boost is not actuated if a velocity of the motor vehicle is below a velocity threshold value or the detected brake pressure is below a pressure threshold value.

12. A method for operating a hydraulic brake system comprising:
    detecting a brake pressure;
    determining an estimating underpressure;
    upon actuation of a hydraulic brake boost determining a brake pedal travel; and
    determining a corrected underpressure based on said estimated underpressure and said brake pedal travel.

13. The method of claim 12 wherein said estimated underpressure is estimated on the basis of the detected brake pressure; and
    actuating the hydraulic brake boost when the estimated underpressure in a underpressure chamber of a brake booster is less than a threshold value.

14. The method of claim 12 wherein the estimated under pressure is based on an ambient pressure.

15. The method of claim 12 including presuming the estimated under pressure remains constant during actuation of the hydraulic brake boost.

* * * * *